Figure 1:
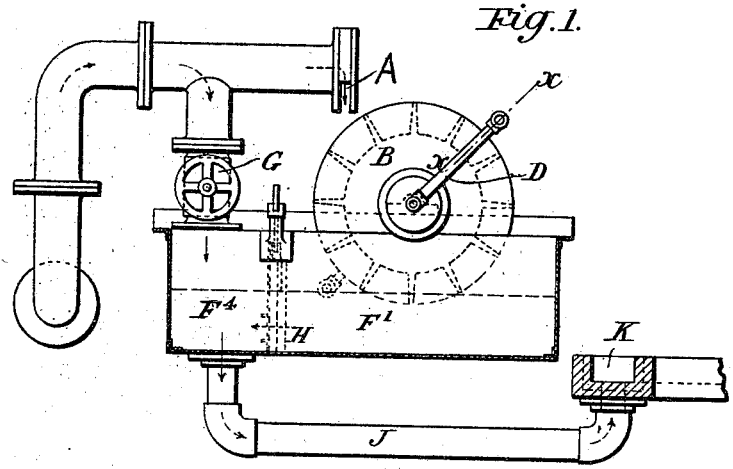

No. 669,626. Patented Mar. 12, 1901.
T. EWAN.
APPARATUS FOR PURIFYING WATER.
(Application filed Mar. 7, 1900.)

(No Model.)

WITNESSES.
Edwin Cruse
Howard M. Gillman, Jr.

INVENTOR.
Thomas Ewan
by
Attorneys.

UNITED STATES PATENT OFFICE.

THOMAS EWAN, OF OLDBURY, ENGLAND.

APPARATUS FOR PURIFYING WATER.

SPECIFICATION forming part of Letters Patent No. 669,626, dated March 12, 1901.

Application filed March 7, 1900. Serial No. 7,708. (No model.)

*To all whom it may concern:*

Be it known that I, THOMAS EWAN, Ph. D., a subject of the Queen of Great Britain, residing at Aluminium Company's Works, Oldbury, England, have invented certain new and useful Improvements in Apparatus for Separating the Oil from Condensed Steam and other Oily Waters, of which the following is a specification.

The water obtained by condensing the exhaust-steam from a steam-engine, for example, is mixed with oil, a large part of which is in a very finely-divided condition. The presence of this oil is objectionable for many purposes, especially when the water is to be reevaporated in steam-boilers. The object of the present invention is to secure the removal of such oil. Owing to the above-mentioned fine state of division of the oil its removal by filtration is very difficult. According to this invention it is proposed to remove the oil by causing a precipitate to which the particles of oil will adhere to be formed in the water and then to remove the precipitate and oil. Good results will be obtained when the precipitated substance is in a gelatinous condition. The precipitate obtained by the simultaneous addition of suitable quantities of a salt of aluminium (alumino ferric or alum, for example) and sodium carbonate (or caustic soda) to the water is peculiarly suitable for the purpose, since it settles down very readily, carrying the oil with it and leaving the water quite clear.

In order to obtain the best results, the substances used in producing the precipitate must be added in chemically equivalent quantities and in proportion to the amount of water to be treated. By experiment it is judged, for example, that two pounds of alumino ferric (containing about fifteen per cent. of $Al_2O_3$) and 0.95 pounds commercial dry sodic carbonate (soda-ash) or 0.7 pounds of caustic soda (NaOH) added in the form of solutions to each one thousand gallons of water to be treated will give satisfactory results. In order to secure the simultaneous addition of equivalent quantities of the two chemicals and at the same time proportion the quantities added to the quantity of water to be treated, the oily water or a portion of it may flow over a small water-wheel with a hollow spindle. To the ends of this spindle hollow arms are attached at right angles to it, which may carry cups at their extremities. The water-wheel rotates in the central section of a tank, which is divided by partitions into three compartments. The two outside compartments are filled with the solutions of the alumino ferric and soda-ash, for example. When the water-wheel is set in rotation by the oily water flowing over it into the central compartment, the cups take up at each revolution definite volumes of the solutions and deliver them through the hollow spindle into the central compartment of the tank, where they mix with the oily water, producing the desired precipitate. Owing to the shape of the cups the volume of solution taken up at each revolution is not affected by the level of the solutions in the outer tanks. The rate at which the wheel revolves should be also sufficiently nearly proportional to the quantity of oily water delivered to insure the formation of a suitable amount of the precipitate in it. The rate at which the water-wheel revolves can be readily regulated by diverting part of the oily water from it and by causing it to dip more or less into the water contained in the central compartment. After the treatment described the water flows into suitable settling-tanks, in which the precipitate, together with the oil, quickly subsides, leaving the clear water, which may be used as desired.

To clearly explain how the invention may be carried out, reference is made to the accompanying drawings, in which—

Figure 2:
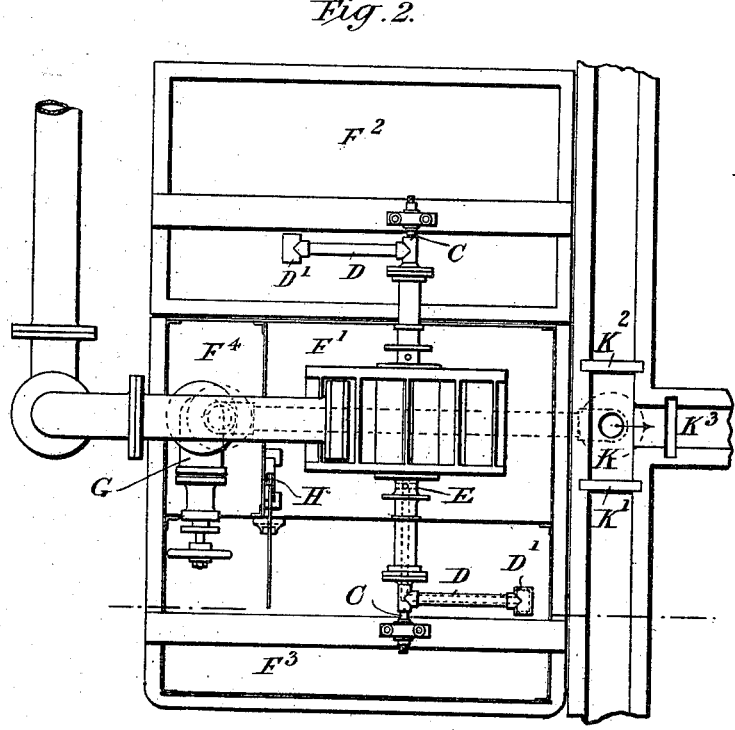

Figure 1 is an elevation of the apparatus. Fig. 2 is a plan view of same, and Fig. 3 is a sectional view on the line $x\ x$, Fig. 1, on an enlarged scale.

In said drawings the oily water from the condenser is brought up by pipe and discharges by a narrow slot at A onto a water-wheel B. The water-wheel B is supported on centers C C, so as to revolve easily. The shaft carrying the wheel is hollow for part of its length and has two hollow crank-arms D D, fitted with special ends D', as shown in enlarged section in Fig. 3. The ends of the crank-arms dip into the chemical liquids in each tank $F^2\ F^3$, taking up a fixed quantity, which passes down the arm D and through the hollow portion of the shaft, passing out by side holes at E into the center tank F', mixing with the oily water therein. The tank F² contains one chemical and the tank F³ the other chemical. A valve G is fixed on the inlet-pipe, so that the flow of oily water from the condenser can be regulated either onto paddle-wheel B or into the separate chamber F⁴, and a sliding door or gate H governs the passage of water from F' into F⁴ as may be desired. By so manipulating the valve G and gate H the speed of rotation of the paddle-wheel can be governed and the quantity of chemicals regulated at will, according to quantity of water passing. The water from F' and F⁴ after having the chemicals mixed with it runs out by pipe J into trough K, having three branches controlled by gates at K', K², and K³, one of which is always open. These troughs lead the water into separate settling-tanks, (not shown,) one of which may be filling, as from gate K³, one settling, and one emptying, and the direction of flow is altered by taking gate out of, say, K² and putting it in K³. The water then goes through K², and so on in turn.

In lieu of settling-tanks it will be evident that filtration may be employed to separate the gelatinous precipitate from the water.

Figure 3:
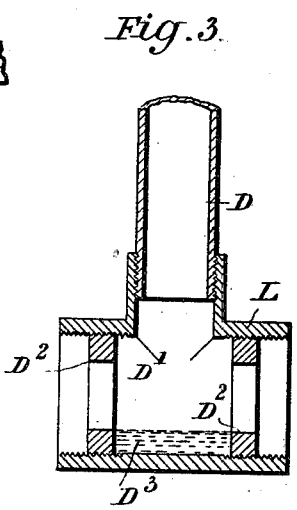

Fig. 3 shows the end D' of crank-arm D. This is made with a short hollow cylinder L at right angles to the arm D, with rings D² screwed into each end for adjusting the distance between them, and consequently their liquid-carrying capacity. It will be seen that the space D³ will be filled with liquid through the center of rings D² each time the end dips in the chemical, and the quantity can be altered by moving the rings. The liquid is passed down the arm as it rises, and the quantity of liquid taken up is the same no matter to what depth the arm is immersed at each revolution.

What is claimed is—

1. In apparatus for separating oil from condensed steam and other oily waters, the combination with a motor-wheel actuated by the flow of the oily water, and a tank for receiving said water, of a hollow shaft carrying said motor-wheel, hollow arms connected with said shaft, hollow cross-heads on said arms, centrally-perforated and adjustable end plate or plates in said cross-heads whereby their carrying capacity can be varied at will, and separate tanks containing chemical solutions into which said cross-heads are adapted to dip, taking up predetermined quantities of the chemical solutions irrespective of the level of such solutions in said separate tanks and delivering such solutions through the hollow arms and shaft to the oily-water tank, substantially as set forth.

2. In apparatus for separating oil from condensed steam and other oily waters, the combination with a motor-wheel actuated by the flow of the oily water, and a tank for receiving said water, of a hollow shaft carrying said motor-wheel, hollow arms connected with said shaft, hollow cross-heads on said arms, centrally-perforated and adjustable end plate or plates in said cross-heads whereby their carrying capacity can be varied at will, separate tanks containing chemical solutions into which said cross-heads are adapted to dip, taking up predetermined quantities of chemical solutions irrespective of the level of such solutions in said separate tanks and delivering such solutions through the hollow arms and shaft to the oily-water tank, and means for regulating the flow of oily water to the motor-wheel, substantially as set forth.

3. In apparatus for separating oil from condensed steam and other oily waters, a cup for taking up a given amount of chemical solution irrespective of the level of the solution in the tank and consisting of a hollow arm and cross-head and centrally-perforated end plates in said cross-head, one of said plates being adjustable relatively to the other to vary the space between them, substantially as described.

In testimony whereof I have hereunto set my hand in the presence of two subscribing witnesses.

THOMAS EWAN.

Witnesses:
  JEAN GRUND,
  RICHARD GUENTHER.